United States Patent [19]

Matt et al.

[11] 4,040,883
[45] Aug. 9, 1977

[54] METHOD OF MAKING A LOW-FRICTION FABRIC BEARING

[75] Inventors: Richard J. Matt, West Simsbury; Richard T. Thompson, Haddam, both of Conn.

[73] Assignee: Textron, Inc., Providence, R.I.

[21] Appl. No.: 700,151

[22] Filed: June 28, 1976

Related U.S. Application Data

[63] Continuation-in-part of Ser. No. 511,086, Oct. 1, 1974, abandoned.

[51] Int. Cl.² .............................................. B32B 5/08
[52] U.S. Cl. ........................................ 156/148; 87/1; 156/172; 308/238
[58] Field of Search ............ 156/172, 173, 187, 189, 156/192, 195, 148, 149; 87/1, 3; 308/238, DIG. 8; 428/253, 422; 139/419, 420 R

[56] References Cited

U.S. PATENT DOCUMENTS

| | | | |
|---|---|---|---|
| 2,752,952 | 7/1956 | Dauphinais | 156/149 |
| 3,067,803 | 12/1962 | Fleury | 156/148 |
| 3,682,201 | 8/1972 | Atwell et al. | 156/149 |
| 3,815,468 | 6/1974 | Matt et al.a | 308/238 |

*Primary Examiner*—Charles E. Van Horn
*Assistant Examiner*—Basil J. Lewris
*Attorney, Agent, or Firm*—Hopgood, Calimafde, Kalil, Blaustein & Lieberman

[57] ABSTRACT

The invention contemplates a method for making fabric-lined bearing wherein the fabric is of knitted construction, from yarn consisting primarily of low-friction filaments and high-strength filaments, and wherein the exposed filaments at the bearing interface are primarily oriented to be generally transverse to the predominant direction of intended motion under load at the bearing interface.

22 Claims, 11 Drawing Figures

METHOD OF MAKING A LOW-FRICTION FABRIC BEARING

This application is a continuation-in-part of our co-pending application Ser. No. 511,086, filed Oct. 1, 1974, now abandoned.

This invention relates to low-friction fabric bearings, to the method of making the same, and to the yarn from which the fabric is made.

Low-friction fabric bearings in use today employ tetrafluoroethylene (TFE) filaments as the low-friction component but are subject to certain limitations which curtail the range of use. For example, maximum or excessive loads are accompanied by undue wear and rapid breakdown. And for higher-temperature applications, maximum operating temperature is unduly limited, due to further mechanical degradation under load or at elevated temperature. It is believed that many of these undesirable limitations arise from the assumption that a preponderance of TFE is required at the bearing surface.

It is, accordingly, an object of the invention to provide an improved bearing construction of the character indicated, and an improved method of making the same.

A specific object is to provide an improved bearing of the character indicated wherein the liner fabric is of knitted construction.

A further object is to provide such a bearing wherein, in the course of a normal primary path of movement for a point on a surface slidingly engaged by the bearing liner, under load, the number of filament traversals will be at substantially a maximum.

A still further object is to provide a method and a fabric whereby a given manufactured size and specification for the fabric can effectively serve a large variety of bearing sizes and configurations.

It is a general object to achieve the foregoing objects with a structure which is inherently relatively economical to manufacture, which is at least equal to the performance of present high-quality bearings within their limited range of use, and which extends beyond present bearings the range of performance in regard to useful life, maximum load and maximum elevated operating temperature.

Other objects and various further features of novelty and invention will be pointed out or will occur to those skilled in the art from a reading of the following specification in conjunction with the accompanying drawing. In said drawing, which shows, for illustrative purposes only, preferred features of the invention:

The invention contemplates major reliance upon bondable filaments, preferably high-strength bondable filaments, such as the DuPont high-temperature aromatic polyamide, an aramid known as Nomex, to function with TFE filaments in the yarn which is compounded for use as the low-friction bearing surface in a fabric-lined bearing element, the liner and its assimilation into the rest of the bearing element being completed and consolidated by a cured synthetic resin. In the preferred form, aromatic polyamide filaments provide high strength and stability at elevated temperatures and are present in the yarn to the extent of at least 50 percent by volume of all filamentary components (including the TFE); preferably, the TFE filaments are present to the extent of 35 to 45 percent by volume, a proportion which corresponds to 20 to 30 percent by area at the bearing surface. It is of importance to the invention that the filaments of the yarn be relatively loose and that they be subjected to as little twist as possible, consistent with an ability to handle the yarn, as in the process of constructing a bearing fabric in which said yarn appears as the major component of the bearing surface material. The yarn may thus be as discussed in greater detail in Matt, U.S. Pat. No. 3,765,978, being preferably washed after fabric construction to remove sizing agents, as also discussed in said patent.

The present invention deals with knitted construction of a fabric, using yarn of the character indicated. Knitted constructions are conveniently made tubular, although a knitted flat fabric can also be used, and the invention is further specifically concerned with the orientation of yarn fibers at the ultimate bearing interface, in terms of the predominant direction of the sliding motion intended for the bearing under load.

Figure 1:
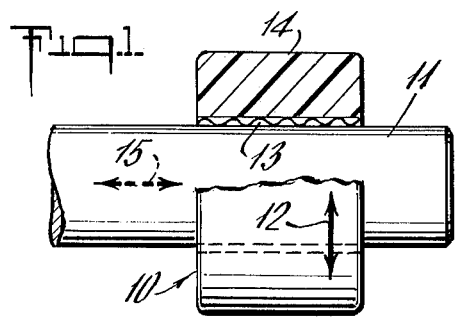
FIG. 1 is a simplified view in elevation, partly broken-away and in longitudinal section, to show a completed bearing of the invention.

It is convenient to begin the description with the case of a journal bearing 10, as shown in FIG. 1, mounted for predominantly rotary sliding motion with respect to a cylindrical shaft 11; the double-headed heavy arrow 12 will be understood to connote the desired rotary nature of sliding action in the bearing 10, for any given interface point on shaft 11, with respect to the adjacent inwardly exposed face of the bearing 10. The bearing 10 is shown as a composite annulus, consisting of a cylindrical bore characterized by the inner face of a tubular knitted low-friction fabric liner 13 constructed as above described. Surrounding and consolidated with the liner 13 is a backing 14 which may be a metal annulus but which is shown as tightly wound glass filaments, built-up to the full outer diameter of the bearing 10, all filaments being set within a body of permanent hardness upon curing a resin impregnant. Such a backing and its consolidation with a fabric liner are described in Matt, et al., U.S. Pat. No. 3,692,375.

In accordance with the invention, the knit construction for liner 13 is such that at least one face thereof is characterized by exposed filaments which have a particular directional orientation, and in applying the liner to the bearing care is taken to orient the exposed-filament orientation at the bearing interface so as to be generally transverse to the predominant direction of sliding motion. Thus, for the journal bearing of FIG. 1, the double-headed dashed-line arrow 15 will be understood to designate the exposed-filament orientation which we find best suited to the manufacture of a journal bearing 10, for which the predominant direction 12 of sliding motion under load is rotary, i.e. circumferential at the bearing interface.

Figure 3:
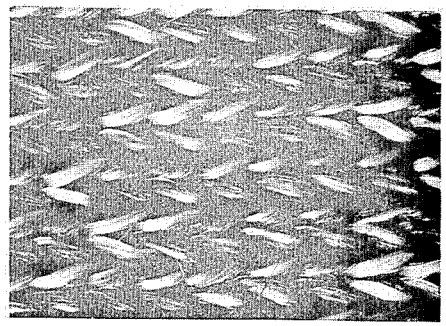
FIGS. 3 and 4 are photographic enlargements of the inner and outer faces of the liner material of FIG. 2, both photographs being oriented consistently such that the liner axis extends left-right across the sheet of drawings.
Figure 4:
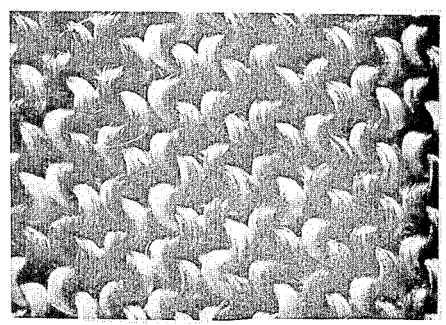

For a purpose which will later become clear, we prefer that liner 13 be constructed as a so-called plain knit or chain stitch. The tubular product of such construction is shown for a short cut-off length in FIG. 2, and the photographic enlargements of FIGS. 3 and 4 illustrate the exposed "face" knit of the inner fabric surface 16 and of the "reverse" knit of the outer fabric surface 17, respectively. In these photographs, the predominant course of exposed filaments is readily observable via the white attributable to the Nomex filaments. Thus, for the inner face 16, exposed filaments are seen to run primarily in the longitudinal direction of the axis of the knitted tube, i.e., the direction of knitting advance; on the other hand, for the outer face 17, exposed filaments are seen to run primarily and generally in the direction transverse to the tube axis.

In production manufacture, the journal bearing of FIG. 1 is constructed upon an elongate cylindrical mandrel, of profile selected to determine a correct ultimate fit to the size of shaft 11. A parting agent is applied to the mandrel, and an elongate length of knitted fabric as described (and of size to fit the mandrel) is washed and dried prior to application to the mandrel, care being taken that it is the longitudinally oriented face 16 which is inwardly facing, to determine the ultimate nature of the bearing interface. Preferably, one end of the knitted tube is taped for retention at one end of the mandrel, and the remainder of the knitted tube is then smoothed out along the mandrel, to eliminate wrinkles, whereupon that other end is also taped. The fabric is now wetted (soaked) with resin for thorough impregnation; and while the resin impregnant is still liquid (A stage), the backing 14 is developed over liner 13 by rotating the mandrel while resin-wetted and tensed glass filaments are coursed along the mandrel, to create tight layers of helically wound glass backing. In the case of a journal bearing, the tension in this wrap radially inwardly compresses the fabric to "flatten" interface yarn against the desired interface contour, thereby assuring (a) utmost filament exposure at the interface and (b) preserving the characteristic predominant directional orientation of the exposed filaments of the face 16. By "flatten," we do not mean that individual filaments are necessarily flattened but rather that the loosely related filaments of the yarn bundle at the interface are caused to spread laterally upon the interface and that curved ends of knitting loops are reduced in bulk to effectively elongate individual filamentary lengths exposed at the interface.

Figure 5:
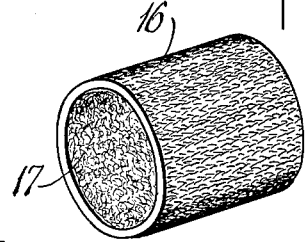
FIG. 5 is a view similar to FIG. 2, to show the result of an inside-out manipulation of the liner material of FIG. 2.

It is a feature of the invention that the described knitted tube of loosely combined TFE and bondable (e.g. aromatic-polyamide) filaments lends itself to applications wherein sliding action under load is transverse to the sense 12 described for the journal bearing of FIG. 1. For example, for a cylindrical-annulus bearing as depicted in FIG. 1 but for which sliding action under load is to be primarily longitudinal (i.e., in the directional sense of dashed-line arrows 15), a cut-off length of the same knitted tube is merely reversed inside-out, as depicted in FIG. 5, to inwardly expose the circumferentially oriented filaments of the face 17 for interface use in the construction of the bearing. All other steps in manufacture remain as already described, with the result that the completed bearing has primarily circumferentially oriented filaments along its inner face. Thus, in longitudinally sliding (e.g., reciprocating) motion along a shaft 11 there is a maximum number of filament traversals for any given element of shaft-loaded area at the interface.

Figure 2:
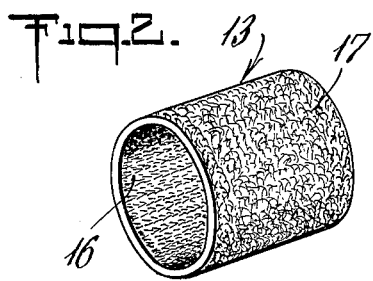
FIG. 2 is a perspective view of a cut length of liner material used in making the bearing of FIG. 1.

Remaining figures of the drawings illustrate a few of the various applications of concepts embraced in the foregoing discussion and description, and the forms of FIGS. 6 to 9 are illustrative of uses of the described tubular knit wherein the longitudinally oriented face 16 is desirably presented at the interface, in view of primarily rotational motion of the bearing under load. For example, in FIG. 6, a plain-spherical bearing intended for self-aligning rotary reciprocation is shown to comprise inner and outer rings 20-21, the bore of the outer ring 21 being characterized by a knit tubular liner 22 of the indicated construction, i.e., the longitudinally oriented face 16 being conformed to the spherical contour 23 of the inner ring 20 and extending in the direction of the axis 24 of the bearing. The bearing may be made in quantity by the technique described in Van Dorn et al., U.S. Pat. No. 3,697,346, namely, by assembling a plurality of inner rings in spaced end-to-end relation along a mandrel, and by applying a parting agent to the resulting external profile; a tubular length, oriented as in FIG. 2, is then smoothed out and resin-impregnated along the loaded mandrel, and the tensed helical wrap of resin-wetted backing filament is applied to radially inwardly compress the liner interface surface into strict conformance with the convex spherical contour of each of the arrayed inner rings 20. After curing the resin to hardness, individual bearings are severed by radial cut-off, as described in said Van Dorn et al. patent.

Figure 7:
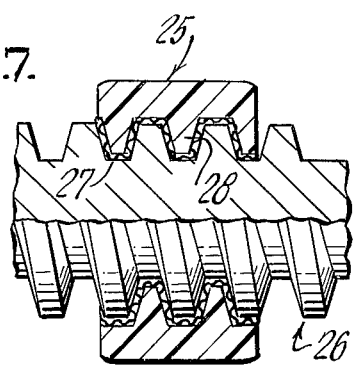
FIGS. 6 to 9 are longitudinal sectional views to illustrate modifications of the bearing structure of FIG. 1.
Figure 6:
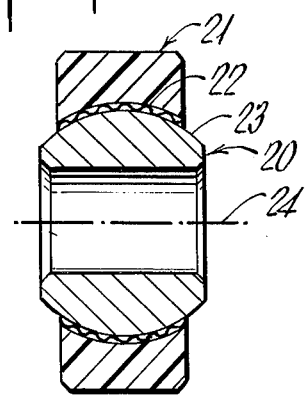

FIG. 7 illustrates application of the invention to a nut 25 characterized by lined thread surfaces, for low-friction coaction with threads of a lead screw 26. The liner 27 of the lead screw is again a knitted tube in the FIG. 2 orientation, i.e., all internally exposed filaments having the predominant longitudinal orientation of surface 16. The nut 25 is made by using a lead screw 26 as the master contour, suitably coated with parting agents and the rest of the procedure is much the same as described for the plain-spherical bearing, i.e., loosely spreading the tubular knit along screw 26, resin-soaking it, and then tightly wrapping with resin-wetted glass filaments, to desired body thickness in the backing; before helically wrapping the entire liner, it is recommended that all resin-wet glass filaments first be drawn together in order to fill the spaces between screw threads (e.g., at 28) and to use such filaments to radially inwardly (and axially outwardly) compress the liner against all thread-groove surfaces, so that the glass filaments can thereafter be spread apart for the ribbon-like winding development described and depicted in said U.S. Pat. No. 3,692,375. The cured product is cut off to desired individual unit length to form the nut 25.

Figure 8:
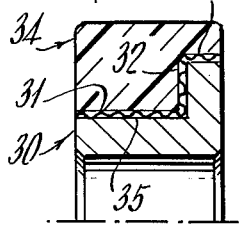
Figure 9:
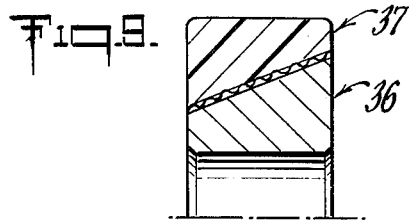

FIGS. 8 and 9 represent combined radial and thrust bearings, where of course primary motion under load is rotary, thus calling for longitudinally oriented filaments (i.e., face 16) at the bearing interface. In FIG. 8, an inner ring 30 is characterized by an inner cylindrical sliding surface 31, a radial sliding surface 32 and an outer cylindrical sliding surface 33. To this desired contour the face 16 of resin-impregnated tubular knit has been conformed by a tight winding of resin-wet backing filaments, to construct a cured resin-impregnated outer ring 34 with its desired permanent orientation of liner 35. In FIG. 9, the sliding contour of an inner ring 36 is conical, and the knitted face 16 is conformed to the same conical contour and compressed by tensed wrapping of resin-wet glass filaments, to build the lined and later cured outer ring 37.

Figure 10:
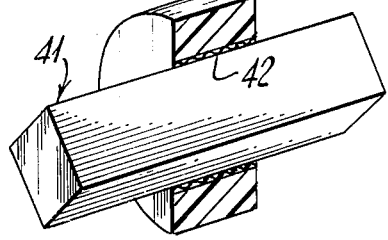
FIGS. 10 and 11 are perspective views, partly broken-away and in section, to show further modified structures.
Figure 11:
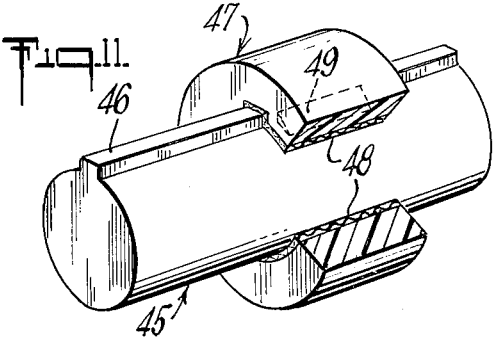

The configurations of FIGS. 10 and 11 are further illustrative of FIG. 5 orientation of knitted tubular liner material, wherein the predominant filament orientation is circumferential at the bearing interface, using face 17 of the material. In FIG. 10, an annular bearing element of ring 40 has a lined bore of polygonal section, shown conformed to the square section of a rod 41, and the primary bearing motion under load is one of longitudinal reciprocation along rod 41. The liner 42 is established by selection of a properly sized knit tube and by orienting this tube as in FIG. 5, applying the same to the rod 41, and then resin-soaking the tube. A tensed wrap of resin-wet glass filaments is then circumferentially developed to radially compress the knit and its inner face 17 into faithful conformance with rod 41. After curing, the thus-built body of ring 40 is cut off to length and externally profiled as desired. FIG. 11 illustrates application to keyed or spline-related elements such as a bar 45 with an elongate key formation 46, for sliding non-rotational accommodation of a lined bearing ring 47. In view of the longitudinal motion involved in use of bearing element 47, the interface filament orientation is selected as circumferential by applying face 17 to the external contour of bar 45. For better conformance of the liner 48 to the radial walls of key 46, a generally triangular prismatic insert 49 (such as a nylon extrusion) is laid up against the wetted fabric to force conformance at juncture of each such wall with the adjacent cylindrical bar surface; thus, upon development of the tensed resin-wet glass-filament wrap, all interface filaments will be compressed against all exposed bar surfaces.

It will be seen that the described invention meets all stated objects. In actual tests of journal bearings involving primarily rotational motion under load, the described transverse orientation of knitted interface filaments (with respect to sliding direction at the interface) is found to produce bearings having ten times the life of similarly constructed bearings in which the filament orientation is generally aligned with the sliding direction at the interface. The bearings thus tested were 1-inch wide, with a 1-inch diameter cylindrical bore and 1.25-inch outer diameter. The radial load on the bearing was 7 tons, and each bearing was subjected to ±25° cycles of rotary reciprocation, at 10 cycles per minute. The yarn used in construction of the knitted tubular liners consisted of one end of 400/60/0 TFE and two ends of 200/100/0 type 430 Nomex, loosely combined at three twists per inch. The knit tube was of 1-inch nominal diameter "plain knit," with a flat relaxed width of 1⅞ inches, a total of 56 needles being used in its construction and the tube was washed and dried prior to resin-impregnation.

While the invention has been described in detail for preferred forms and methods, it will be understood that modifications may be made without departing from the invention. For example, the same principles of filament orientation with respect to the predominant direction of sliding motion under load apply equally (a) to the construction of flat-surface bearings (in which case, a flat knit may be constructed, or tubular knit may be longitudinally cut to make a flattenable piece of fabric) and (b) to the construction of rotary bearings in which the liner is external to the body of the element into which it is built. Of course, in any application of such knitted tubing to an external convex surface, for rotary support (i.e., primarily rotational motion under load) of the similarly contoured concave surface of an outer bearing element, the FIG. 5 orientation of the knitted tube should be used, to expose the longitudinally oriented face 16 at the bearing interface.

Also, for example, the invention is not to be considered to be limited to the particular TFE/Nomex yarn of the preferred embodiment. Tests employing bondable fibers other than Nomex (specifically, Dacron in one case, 6,6 nylon in another case) have shown the same order of wear/life improvement as noted above for the TFE/Nomex yarn, when comparing the face vs. reverse performance of any given knitted fabric in a bearing. The invention is thus to be understood in its broad aspect as involving a particular orientation of the knitted fabric in relation to a predominant direction of intended sliding displacement at the bearing interface, where the knitted fabric is made from a yarn having low-friction (TFE) filaments and bondable filaments (of which Nomex, Dacron and 6,6 nylon are merely illustrative).

What is claimed is:

1. The method of making an annular bearing having a low-friction fabric lined surface of predetermined contour to accommodate a load under sliding conditions wherein the fabric surface slides generally along a particular directional path of movement, which method comprises selecting a loosely twisted yarn consisting of TFE filaments and bondable filaments, constructing a knitted tube with said yarn as the most predominant component, said tube being so constructed that on one side of said tube exposed filaments are primarily oriented in the direction of the tube axis and on the other side of said tube exposed filaments are primarily oriented normal to and circumferential to the tube axis, impregnating the fabric with an uncured synthetic resin, conforming the circumferential extent of a selected side of the knitted tube to a selected forming element having a forming-surface contour conforming to said predetermined contour, the selected side forming the bearing interface and being chosen as that for which there is the greater non-conformance of primary orientation of the exposed filaments with respect to said particular directional path of movement, curing the resin while the tube is thus confined, and mounting the bearing such that sliding action under load is along said particular directional path of movement.

2. The method of making a low-friction bearing for slidable support of a load along a particular desired directional path of movement, which method comprises selecting a loosely twisted yarn consisting of TFE filaments and bondable filaments, knitting said yarn into a fabric such that on one side of said fabric exposed filaments are primarily oriented in one direction, impregnating the fabric with an uncured synthetic resin, selecting a forming element having a forming-surface contour conforming to said path of movement, conforming the fabric to the forming-surface contour, while also orienting the exposed filaments of said one side which will form the bearing interface so as to be generally transverse to the direction of desired movement in said path, curing the resin while the fabric is thus confined, and mounting the bearing such that sliding action under load is along said particular directional path of movement.

3. The method of claim 2, in which said bondable filaments are of a polyamide material.

4. The method of claim 2, in which said bondable filaments are of Dacron.

5. The method of making a low-friction bearing for slidable support of a load along a particular desired directional path of movement, which method comprises selecting a loosely twisted yarn consisting of TFE filaments and aromatic polyamide filaments, knitting said yarn into a fabric such that on one side of said fabric exposed filaments are primarily oriented in one direction, impregnating the fabric with an uncured synthetic resin, selecting a forming element having a forming-surface contour conforming to said path of movement, conforming the fabric to the forming-surface contour while also orienting the exposed filaments of said one side which will form the bearing interface so as to be generally transverse to the direction of desired movement in said path, curing the resin while the fabric is thus confined, and mounting the bearing such that sliding action under load is along said particular directional path of movement.

6. The method of claim 5, including the step of tightly compressing the impregnated fabric to said forming-surface contour throughout performance of the curing step.

7. The method of claim 6, wherein said TFE and polyamide filaments are continuous.

8. The method of making an annular bearing having a low-friction fabric lined surface of predetermined contour to accommodate a load under sliding conditions wherein the fabric surface slides generally along a particular directional path of movement, which method comprises selecting a loosely twisted yarn consisting of TFE filaments and aromatic polyamide filaments, constructing a knitted tube with said yarn as the most predominant component, said tube being so constructed that on one side of said tube exposed filaments are primarily oriented in the direction of the tube axis and on the other side of said tube exposed filaments are primarily oriented normal to and circumferential to the tube axis, impregnating the fabric with an uncured synthetic resin, conforming the circumferential extent of a selected side of the knitted tube to a selected forming element having a forming-surface contour conforming to said predetermined contour, the selected side forming the bearing interface and being chosen as that for which there is the greater non-conformance of primary orientation of the exposed filaments with respect to said particular directional path of movement, curing the resin while the tube is thus confined, and mounting the bearing such that sliding action under load is along said particular directional path of movement.

9. The method of claim 8 as applied to making a rotary bearing, wherein a predominantly circumferential directional component characterizes the path of sliding movement, the said selected side of the knitted tube having its exposed filaments oriented in the direction of the tube axis.

10. The method of claim 9, in which the predetermined contour is cylindrical.

11. The method of claim 9, in which the predetermined contour is spherical.

12. The method of claim 9, in which the predetermined contour is characterized by a helical progression of threads.

13. The method of claim 9, in which the predetermined contour is characterized by contiguous cylindrical and radial-plane surfaces.

14. The method of claim 9, in which the predetermined contour is characterized by a conical surface.

15. The method of claim 8 as applied to making a tubular bearing, wherein a predominantly axial directional component characterizes the path of sliding movement, the said selected side of the knitted tube having the exposed filaments which have primary orientation in the circumferential direction of the axis of the knitted tube.

16. The method of claim 15, in which the predetermined contour is cylindrical.

17. The method of claim 15, in which the predetermined contour is a polygon of constant section.

18. The method of claim 15, in which the predetermined contour is characterized by contiguous cylindrical and radial surfaces wherein the radial surface is in a plane extending in the longitudinal direction of the axis of the cylindrical surface.

19. The method of claim 8, in which the TFE filaments and the aromatic polyamide filaments are in the proportion of 35 to 45 percent TFE by volume.

20. The method of claim 8, in which the knitted tube is washed in sizing-agent solvent prior to resin-impregnation.

21. The method of claim 8, in which the construction is of the plain-knit variety.

22. The method of claim 8, wherein the forming-surface contour is obtained by selecting an elongate mandrel having an outer surface characterized by said contour, and wherein the step of conforming the fabric to said contour includes circumferentially tightly winding a resin-wetted glass-filament backing around the impregnated fabric.

* * * * *